May 6, 1947.     E. J. HARDIG     2,420,133
TRACK FOR TRACK-LAYING VEHICLES
Filed Aug. 19, 1944     3 Sheets-Sheet 1

Inventor

EUGENE J. HARDIG,

By C. E. Herrstrom & H. E. Thibodeau
Attorneys

May 6, 1947.　　　　E. J. HARDIG　　　2,420,133
TRACK FOR TRACK-LAYING VEHICLES
Filed Aug. 19, 1944　　　3 Sheets-Sheet 2
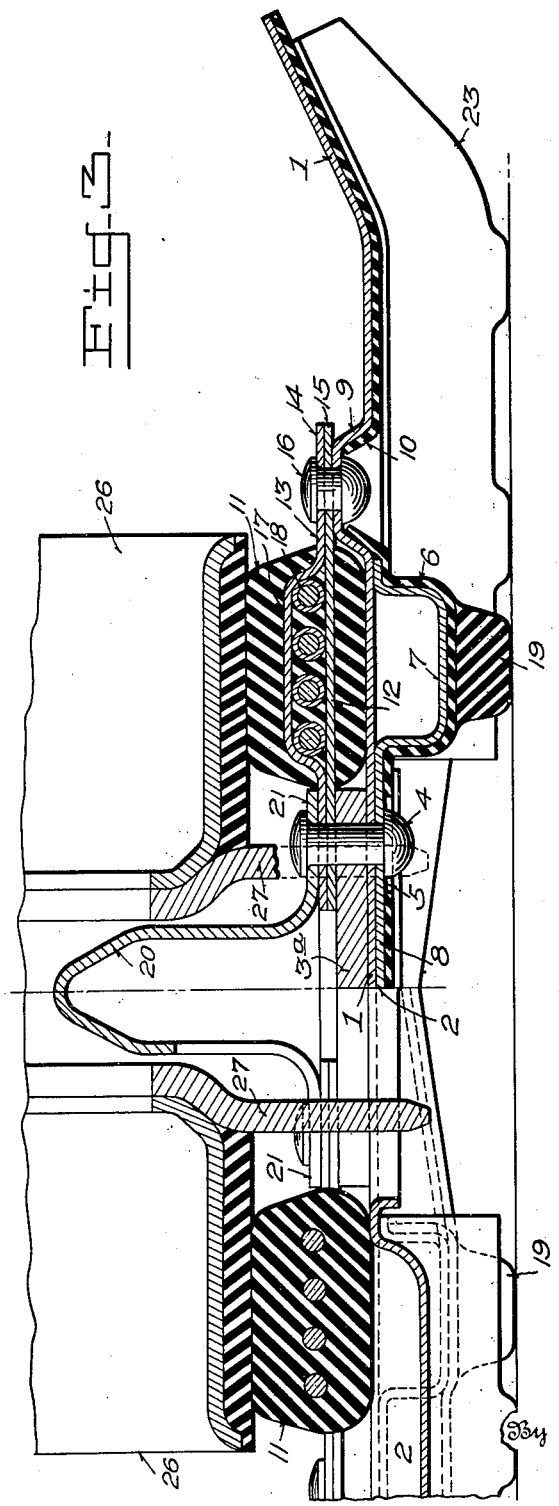
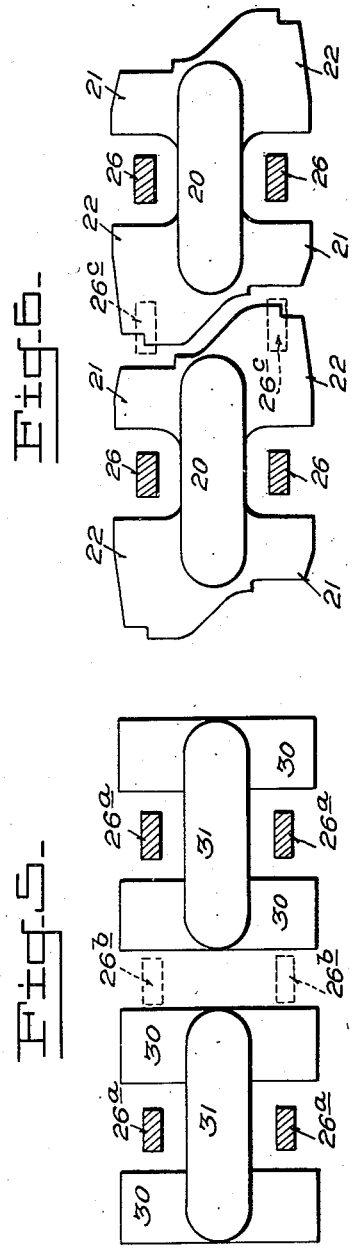
Inventor
Eugene J. Hardig,
By C. E. Herrstrom & W. E. Thibodeau
Attorneys Patented May 6, 1947

2,420,133

UNITED STATES PATENT OFFICE 2,420,133

TRACK FOR TRACK-LAYING VEHICLES

Eugene J. Hardig, South Bend, Ind., assignor to The Studebaker Corporation, South Bend, Ind., a corporation of Delaware Application August 19, 1944, Serial No. 550,252

3 Claims. (Cl. 305—10)

The present invention pertains to a novel track for track-laying vehicles. Many of these tracks embody upstanding guide members on the individual blocks for lateral engagement with the teeth of the driving sprocket for the purpose of preventing the track from slipping laterally or transversely off the sprocket. Nevertheless, the track frequently slips longitudinally to such extent that the sprocket teeth engage in the spaces between the blocks. These spaces are not traversed by the guides, and consequently the track is liable to be pulled laterally off the sprocket.

One of the objects of this invention is to provide a novel block construction, preferably incorporated in the guide, for preventing the occurrence of this condition. The edges of the blocks transverse of the track are made irregular rather than straight, with projections from each block extending into indentations in the adjacent blocks along the areas engaged by the sprocket wheel. Thus, if the track slips in the manner described above, the sprocket teeth come into engagement with the projected areas and are subjected to the tension or the weight of the track, either of which constitutes a frictional resistance to the lateral pulling of the track off the sprocket. The projections and indentations are preferably incorporated in the configuration of the lugs by which the guides are fastened to the blocks.

Another object of the invention resides in a novel assembly of track shoe, guide and bands in a band track. This assembly is designed so that stampings may be substituted for castings or forgings to a substantial extent and at the same time provide the required strength and rigidity.

An illustrative embodiment of the invention is disclosed in the following description and in the accompanying drawings in which:

Figure 3 is a section on line 3—3 of Figure 1;

Figure 1:
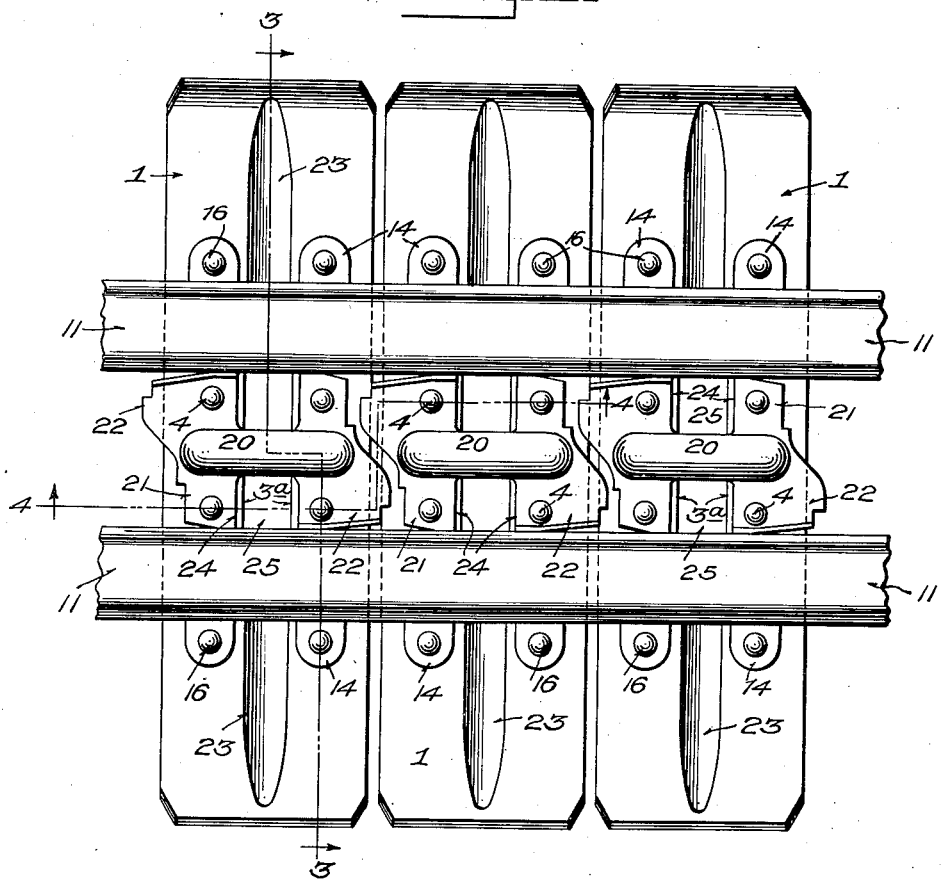
Figure 1 is a plan view of the track.
Figure 2:
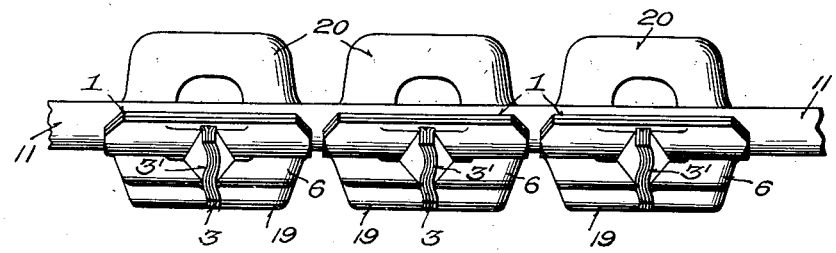
Figure 2 is an end view thereof.
Figure 4:
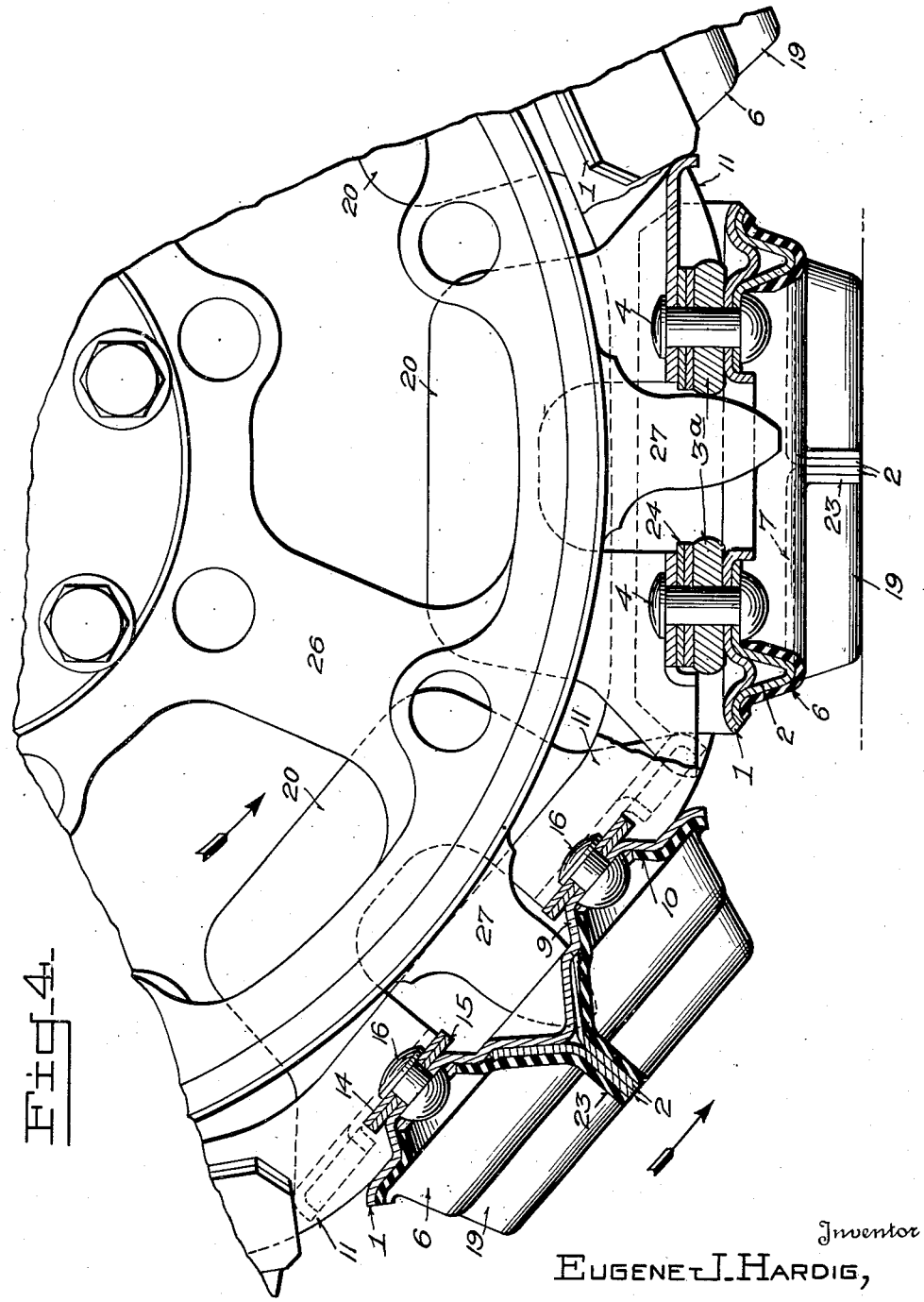
Figure 4 is an elevation of a sprocket wheel with the track thereon shown in longitudinal section on the line 4—4 of Figure 1, and Figures 5 and 6 are diagrammatic views showing a comparison of the invention with the prior art.

The track shoe includes a pair of stamped plates 1 and 2, one superposed on the other, of substantially rectangular shape and having their longer dimension lying transversely of the track. Although this is the longer dimension, it will be designated as the width, and other parts extending in the same direction will be described as transverse, to conform with similar terms used in the description of the assembled track. Each lower plate 2, in fact, consists of two sections abutting in a transverse plane and turned outwardly to form a set of juxtaposed flanges or laminations 3 for a purpose that will presently be described. In describing parts as being disposed one upon the other, reference is had to a portion of the track lying in engagement with the ground.

A pair of stiffening and anchoring members 3a is laid upon and across the upper shoe plate 1 and is fastened thereto by transverse rows of rivets 4. The rubber covering 6 on the bottom of plate 2 is slotted at 5 around the head of the rivet. Each plate 2 is dished or cupped downwardly to form two cup members 7 with a flat portion 8 extending between said cup members. The plate 2 is secured to the plate 1 by rivets 4 extending through apertures in the flat portion 8 and plate 1.

The plates 1 and 2 are dished upward in coincidence, at 9 and 10 respectively, at four points on opposite sides of the longitudinal and transverse center lines of the plates. The tops of these protuberances are in the same plane with the upper surfaces of the stiffeners 3, thereby forming supports for the continuous bands connecting the blocks constituting the track.

Each band 11 is a heavy elastic member traversing the alined blocks and having molded therein, for each block, a pair of sheet metal strips 12 and 13 projecting beyond the longitudinal edges of the band to form attaching lugs 14 and 15 respectively. The lugs 14 and 15 fastened on the protuberances 9 by rivets 16. In this position, with the bands running lengthwise of the track, the lugs 15 rest upon the members 3 and are fastened thereto by the rivets 4. The inner lugs 15 of the two band assemblies terminate short of the longitudinal center line of the block as shown in Figure 3. The upper strip 13 is dished upward at 17 within the band, and the space thus formed receives a series of parallel cords or wires 18 co-extensive with the band and serving as a reinforcement.

Beneath each band 11, a rubber cushion 19 is vulcanized to the bottom of each cup 7, extending lengthwise of the block although not continuous from block to block, and molded around the laminations 3. The exposed ends of the laminations are preferably bent into a corrugated or sinous form, as indicated by the numeral 3', for strengthening.

Finally, between the bands 11 on each block is mounted a stamped, upstanding center guide member 20 formed on each side with a base flange or mounting plate comprising a pair of lugs 21 and 22 also held by the rivets 4. The track shoe 1, 2 is formed with a transverse central rib 23 which is necessarily interrupted at the bands and at the guide. The lugs 21, 22 at each side of the guide are spaced apart at 24 to receive the sprocket teeth.

The sprocket wheel 26 is of well-known design comprising two sets of opposed sprocket teeth 27 entering the spaces 24 and thereby driving the track. In this movement they straddle the guides 20, so that the guides obstruct transverse shifting of the track relatively to the sprocket wheel.

The lugs 22 of a given block are diagonally opposite each other with respect to the guide, and the lugs 21 are likewise diagonally opposite each other. The lugs 22 project beyond the lugs 21 in the direction of the track and toward the nearer transverse edges of the block. Thus, between the bands 11, each block presents an irregular transverse edge crossing the lines of tooth engagement and fitted or complementary to the adjacent edge of the next block.

Experience with assemblies of this general character shows that the track frequently slips lengthwise with respect to the sprocket to bring the sprocket teeth between adjacent guides, whereupon the track is readily pulled transversely of the sprocket. This condition is illustrated in the diagram, Figure 5. The normal position of the sprocket teeth is illustrated at 26a between the lugs 30 and at opposite sides of the guides 31. A longitudinal displacement brings the sprocket teeth to the position illustrated at 26b into the space between the lugs and guides of adjacent blocks. A lateral force of the track is then substantially unopposed and consequently pulls the track off the sprocket.

The operation of the improved track is illustrated in the diagram, Figure 6. There is no space between adjacent lugs to receive the sprocket teeth freely when they are displaced to the position 26c. In this position they bear against the projected lugs 22 and are subjected either to the tension of the track or the weight of the vehicle, either of which opposes transverse shifting of the track until the sprocket teeth are returned to their normal position at opposite sides of the respective guides.

While a specific embodiment of the invention has been shown and been described, it will be understood that various alterations may be made without departure from the spirit of the invention as indicated by the appended claims.

What I claim is:

1. In a band track, the combination of a track shoe, a sprocket wheel guide member including a guiding element and mounted on said track shoe, the area transversely adjacent to said guide element being adapted for engagement by sprocket teeth, the transverse edges of said guide member being formed each with a projection extending in the direction of travel, the projections on a given block being substantially in diagonally opposite relation, whereby similarly shaped successive blocks form irregular juncture lines across the direction of travel.

2. In a band track, the combination of a track shoe, a center guide thereon, means providing recesses for the teeth of the driving sprocket, said recesses being spaced transversely of the track and disposed on opposite sides of the center guide, and means carried by each shoe and overlying the space between said shoe and the next adjacent shoe for obstructing the passage of sprocket teeth therebetween.

3. In a band track, the combination of a track shoe, a center guide thereon, means providing recesses for the teeth of the driving sprocket, said recesses being spaced transversely of the track and disposed on opposite sides of the center guide, a plate carried by each shoe and extending on one side of said center guide in the direction of travel beyond the transverse edge of said shoe and receding from said transverse edge on the other side of said center guide for substantially interfitting with a complementary plate disposed adjacent said transverse edge on the next adjacent shoe.

EUGENE J. HARDIG.

REFERENCES CITED

The following references are of record in the file of this patent:

UNITED STATES PATENTS

| Number | Name | Date |
|---|---|---|
| 2,025,999 | Myers | Dec. 31, 1935 |
| 1,795,618 | Ronk | Mar. 10, 1931 |
| 2,321,202 | Heine | June 8, 1943 |